United States Patent Office 3,206,475
Patented Sept. 14, 1965

3,206,475
PROCESS FOR THE PURIFICATION OF
TRIMELLITIC ANHYDRIDE
Russell V. Malo, Munster, Ind., assignor to Standard Oil
Company, Chicago, Ill., a corporation of Indiana
No Drawing. Filed May 29, 1963, Ser. No. 283,974
2 Claims. (Cl. 260—346.3)

This invention relates to the manufacture of trimellitic anhydride, and specifically to the purification of trimellitic anhydride.

Trimellitic acid is readily made by oxidizing a 1,2,4-trialkyl benzene, such as cumene. The oxidation may be conducted, for instance, in accordance with the process disclosed in U.S. Patent No. 2,833,816. A multi-million pound per year commercial plant for making trimellitic acid according to such process is now in operation. After the trimellitic acid has been made, it is usually dehydrated to trimellitic anhydride and sold in the form of the anhydride. The dehydration may be done as disclosed in Liao et al.'s U.S. Patent No. 2,971,011 or by heating under vacuum. The final step in trimellitic anhydride manufacture is that of purifying the anhydride, by crystallization from an aromatic, as disclosed in such patent, by distillation, or, more preferably, by fractionation with reflux. Inasmuch as trimellitic anhydride has a vapor pressure of 2.5, 8, 22, 55 and about 130 millimeters of mercury at 400°, 450°, 500°, 550° and 600° F., respectively, and does not decompose to lower boiling products at such temperatures, vacuum fractionation is practical.

However, it has been discovered that the recovery of product trimellitic anhydride during the purifying fractionation is severely limited by the formation from the trimellitic anhydride of higher molecular weight, higher boiling compounds which cannot be distilled at 600° F. or even 640° F. at the low pressure of 30 millimeters of mercury absolute. To overcome the problem, I have discovered that the addition of a small amount of steam to the vacuum fractionation of trimellitic anhydride effectively increases the recovery of product trimellitic anhydride, at bottoms temperatures less than 640° F., or even 600° F.

The purifying fractionation of trimellitic anhydride is conducted at a total absolute pressure (of steam plus organic material in the fractionation column feed) of less than about 350, such as about 10 to about 150, preferably towards the lower end of such range, millimeters of mercury absolute pressure, and at maximum fractionation column bottoms temperatures in the range of 450 to 650° F. The fractionation may be continuous or it may be a batch fractionation. The batch fractionation is preferably conducted by initially adding the steam to the pot after 50 to 80% of the trimellitic anhydride in the charge has been distilled overhead, or as soon as the pot liquid reaches a temperature of about 500°–550° F.

The steam may be added as steam, with or without superheating, or water may be injected into the fractionation column and will immediately turn to steam at the foregoing conditions of temperature and pressure. The existence of a separate liquid water phase in contact with the vapors being fractionated would restrict the system to one degree of freedom, rather than two degrees. Such a phase is unnecessary, undesirable, and will not occur at such conditions. The amount of steam used is small, being sufficient to provide only a partial pressure steam in the range from about 1 to about 10 millimeters of mercury, and less than the partial pressure of the trimellitic anhydride in the fractionation column's bottom vapors. Preferably, the maximum total pressure in the fractionation column is less than 150 millimeters, and is advantageously in the range of about 5 to 50 millimeters, of mercury and the partial pressure of the steam used is in the range of about 1 to about 4 millimeters of mercury.

In conducting the distillation in accordance with this invention, generally the overhead vapors at the top of the fractionation column will be passed into a "hot" condenser, in which trimellitic anhydride is condensed, and thereafter the vapors passed to a "cold" condenser in which lower boiling materials are condensed and rejected from the system. A vacuum is maintained by means of a vacuum pump or, more commonly in commercial operations, a steam ejector. The hot condenser may be operated over a wide range of temperatures, from 340° F. to 500° F., preferably 350°–450° F., depending upon the temperature and pressure used in the distillation column. The hot condenser is operated at a temperature high enough to avoid solidifying trimellitic anhydride and low enough to prevent excessive amounts of trimellitic anhydride from escaping with the lower boiling constituents, such as water, benzoic acid, toluic acids, and methyl benzene dicarboxylic acids, etc.

The invention is further described below in connection with illustrative examples of its practice.

The first example described illustrates a fractionation of trimellitic anhydride wherein no steam was used and the recovery of distillate trimellitic anhydride was only about 70%. The fractionation was conducted using a glass column packed with 24 inches of ⅛ inch by ³⁄₁₆ inch Heli-Paks made of Hastaloy-C. Above the column was a hot condenser operated at 320° F. initially and increasing to 385° F. towards the end of the fractionation. The column and hot condenser were maintained at a common temperature in an enclosure designated as a "hot box," rather than being individually temperature-controlled. Vapors which were not condensed in the hot condenser passed through a first trap maintained at 32° F. with wet ice, a second trap maintained at about −100° F. with Dry Ice-acetone, and a third trap maintained at about −320° F. with liquid nitrogen. Heat was supplied through an electrical heating mantle. A pump was used to maintain vacuum on the column. A magnetic stirrer was used to agitate the still pot liquid.

The charge consisted of 600 grams of trimellitic anhydride having a purity of 93.73 weight percent. The impurities in the charge were 0.04% benzoic acid, 2.09% phthalic acids, 0.70% methyl benzene dicarboxylic acids, and 3.44% of higher boiling unidentified compounds. The analyses given above and elsewhere hereinafter were determined by esterification gas chromatography.

The fractionation was conducted by slowly bringing the column on stream at total reflux using a total pot pressure of 26 millimeters of mercury and a top pressure (measured downstream from the traps) of 5 millimeters of mercury. The first cut was taken at a 2.5:1 reflux ratio, equaled 2.57% of the charge and contained 97.9% trimellitic anhydride. (As used herein in discussing the laboratory work, reflux ratio is the ratio of the time, measured in seconds, liquid condensate was directed to the fractionation column, divided by the time liquid condensate was directed to the product receiver.) Cuts 2, 3 and 4 were taken at a 2.5:1 reflux ratio, and totaled 14.2% of the charge. Each cut contained 99.0% or more trimellitic anhydride. The pot temperature at Cut 4 was 520° F., while the pot and head pressures were 25 and 1.9 millimeters of mercury.

The next five cuts (Nos. 5–9) were taken off at a reflux ratio of 2.5:1 and totaled 39.38% of the charge. Each of these cuts likewise contained at least 99.0% trimellitic anhydride, with a weighted average purity of 99.3%. The pot pressure during this stage of the fractionation was initially 25 millimeters of mercury, but was gradually reduced to 10±2 millimeters of mercury, while the head pressure was 2.1–2.3 millimeters of mercury. The condensing temperature was correspondingly increased from 330° F. to about 385° F. The pot temperature was increased gradually, reaching 600° F. when about 43% of the charge had been taken overhead (which was during Cut No. 7) and reaching 643° F. during the collection of the 8th and 9th cuts.

During the fractionation, a total of 334.3 grams of trimellitic anhydride was recovered in Cuts 1–9, and 54.5 grams of trimellitic anhydride in the traps, representing 59.5% and 9.7% of the trimellitic anhydride in the charge, respectively. The high percentage of trimellitic anhydride recovered in the traps was due to air leaks in the equipment, which prevent total condensation of the trimellitic anhydride in the hot condenser.

Upon shutting down the distillation, 23.68 weight percent of the charge remained in the pot. The residual pot liquid was analyzed and found to have 35.5% trimellitic anhydride, 0.13% orthophthalic acid, 0.58% iso- and terephthalic acids, and about 63.8% of higher boiling unidentified compounds. Such compounds in the pot amount to 16.1% of the trimellitic anhydride in the charge, or 12.5 after correcting for the 20.6 grams of such compounds in the charge. The overall material balance on the foregoing run was 97.45% of the charge.

In an attempt to increase the recovery of a trimellitic anhydride, a 25 gram aliquot of the residual pot material was refluxed for two hours with 100 grams of an aqueous 1% HCl solution. This refluxing procedure did not result in converting any high boiling compounds to trimellitic anhydride (or to trimellitic acid), inasmuch as analysis of the pot material after refluxing showed substantially the same amounts of orthophthalic, isophthalic and terephthalic acids, and the equivalent of 34.7% of trimellitic acid in the form of trimellitic acid.

In order to avoid the excessive loss of trimellitic anhydride to higher boiling unidentified compounds, a similar run was conducted, but in which steam was used towards the end of the fractionation. The equipment used was similar to that described above, except that the column was 1½ inches in diameter and packed with 18 inches of ⅜₆ inch of No. 316 stainless steel Octa-Paks.

The charge to this run consisted of 765.6 grams of trimellitic anhydride having a purity of 94.4%. Impurities consisted of 0.08% benzoic acid, 2.3% phthalic acids, 0.94% methyl benzene dicarboxylic acids, 0.46% trimesic acid, and 1.82% higher boiling unidentified compounds.

The fractionation was initiated in a manner similar to the preceding fractionation. The initial cut was 2% of the charge, taken at a 5:1 reflux ratio, and had 96.6% trimellitic anhydride. When this cut was taken off, the pot temperature was 458° F., pot pressure 6.0 millimeters of mercury and the head pressure was 4.2 millimeters. The next four cuts comprised 12.6% of charge and had a weighted average purity of 98.6% trimellitic anhydride. These cuts were taken at a 5:1 reflux ratio. At the end of the fifth cut, the pot temperature was 468° F. and the pot and head pressures were 6.0 and 5.2 millimeters of mercury, respectively. Reflux ratio was then decreased to 2:5, and the next four cuts (Nos. 6–9) were taken, comprising 31.4% charge and having a weighted average purity of 98.7% trimellitic anhydride, at that ratio. At the end of the ninth cut, the pot temperature was 482° F.; the head pressure was 4.8 millimeters of mercury.

At this point, a small amount of water was continuously pumped through a heated quartz coil and the superheated system was injected into the pot during the remainder of the fractionation. The three cuts taken off during the period when steam was added to the fractionation comprised 22.6% of charge and had a weighted average purity of 99.0% trimellitic anhydride. During the fractionation of these cuts, the reflux ratio was 2:5, the pot pressure was 11, and the head pressure 9.6–10.1 millimeters of mercury. The pot liquid temperature at the end of the twelfth cut was 558° F. The total water used was 8 cc., over a period of about 72 minutes during which Cuts Nos. 10–12 were taken off.

The total recovery of distillate trimellitic anhydride, including that recovery in the traps, was 80.4% of trimellitic anhydride in the charge. Despite the fact that the distillation was terminated at a temperature of 600° F., the pot liquid was only 9.5% of charge and upon analysis was found to have only 7.3% of unidentified higher molecular weight compounds, and 87.9% trimellitic anhydride. Due to mechanical failures on two occasions during the run, small portions of the liquid in the pot backed-up into the water inlet line and were therefore removed from the fractionation system. At the end of the run, such portions were recovered, and amounted to 74.5 grams.

The addition of the steam towards the end of the distillation was successful in suppressing the formation of higher molecular weight unidentified compounds from the trimellitic anhydride in the charge. Overall weight balance was 99.6%.

The best mode contemplated for the practice of this invention is a continuous vacuum fractionation conducted at a pressure in the bottom fractionator in the range of about 10 to 20 millimeters of mercury. Sufficient low pressure steam is injected to the bottom of the fractionating column and above the pool of liquid maintained therein to provide from 1–3 millimeters of mercury partial pressure of steam. The fractionator is designed to provide about 3 theoretical plates. Sufficient boil-up will be provided to assure reflux ratio of at least 1.2, preferably 1.5–2.5. The temperature of the liquid in the bottom fractionator is in the range of 470–500° F.; while the hot cendenser is operated at 350° F.

The process herein disclosed and claimed is not one of steam distillation. Reference to standard texts, such as Kirk-Othmer's "Encyclopedia of Chemical Technology," volume 5, page 184 (1950); Perry's Chemical Engineering Handbook (3rd edition, 1950), pages 582 et seq.; Walker et al.'s Principles of Chemical Engineering (3rd edition, 1937), pages 514 et seq., and particularly to R. J. Hengstebeck's Distillation—Principles and Design Procedures (1961, Reinhold Publishing Corporation), pages 197–198, will reveal that such process is a fractionation, and uses insufficient steam to qualify as a steam distillation, in addition to the fact that the fractionation is conducted at pressures and temperatures at which trimellitic anhydride is readily distilled, according to its vapor pressure-temperature relationship, without decomposing and without the use of steam. However, the use of a small amount of steam, sufficient to give steam partial pressure in the range of about 1 to about 10 millimeters of mercury and less than the partial pressure of the trimellitic anhydride at the conditions used in the fractionating column, yields the unexpected result of suppressing the formation from trimellitic anhydride of unidentified high molecular weight high boiling compounds, thus permitting greater recovery of product purified trimellitic anhydride.

Having thus described the invention, what is claimed is:

1. The process which comprises fractionating trimellitic anhydride at a total pressure less than about 350 millimeters of mercury absolute in the presence of steam but in the absence of any liquid water phase in substantial equilibrium with the fractionator vapors, wherein the partial pressure of the steam is in the range of from about 1 to about 10 millimeters of mercury and less than the partial pressure of the trimellitic anhydride in the vapor, and whereby the formation from trimellitic anhydride of higher boiling compounds is suppressed.

2. The process of claim 1 wherein said maximum pressure is in the range of about 5 to 50 millimeters of mercury and the partial pressure of steam is in the range of about 1 to 4 millimeters of mercury.

References Cited by the Examiner

UNITED STATES PATENTS 2,971,011   2/61   Liao et al. _____ 260—346.3

NICHOLAS S. RIZZO, *Primary Examiner.*